(12) United States Patent
Chen et al.

(10) Patent No.: US 7,789,797 B2
(45) Date of Patent: Sep. 7, 2010

(54) METHODS AND SYSTEMS FOR DRIVE-TO-NEUTRAL AND NEUTRAL-TO-DRIVE TRANSMISSION GARAGE SHIFT QUALITY IMPROVEMENT

(75) Inventors: Gang Chen, Rochester Hills, MI (US); Hussein A. Dourra, Bloomfield, MI (US); Maged Choucair, Dearborn Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 654 days.

(21) Appl. No.: 11/741,230

(22) Filed: Apr. 27, 2007

(65) Prior Publication Data
US 2008/0269014 A1    Oct. 30, 2008

(51) Int. Cl.
F16H 61/04    (2006.01)
(52) U.S. Cl. .......................... 477/116; 477/94
(58) Field of Classification Search .................. 477/116
See application file for complete search history.

(56) References Cited

U.S. PATENT DOCUMENTS

| | | | |
|---|---|---|---|
| 4,665,777 A * | 5/1987 | Kikuchi et al. | 477/93 |
| 5,046,178 A | 9/1991 | Hibner et al. | |
| 6,283,891 B1 * | 9/2001 | Wozniak et al. | 477/94 |
| 6,558,293 B2 | 5/2003 | Skupinski et al. | |
| 2002/0098943 A1 * | 7/2002 | Shultz et al. | 477/94 |

* cited by examiner

Primary Examiner—Sherry L Estremsky
Assistant Examiner—Erin D Bishop
(74) Attorney, Agent, or Firm—Ralph E. Smith (57) ABSTRACT

The present disclosure improves both the D-N and N-D garage shift by reducing torque applied to the powertrain mount system and vehicle suspension systems during garage shifts. Since less energy in stored in the mount system and suspension system, the reaction bump during garage shifts will be reduced without compromising vehicle performance. For the N-D garage shift, such as after key-on when a shift lever is positioned in drive, a vehicle shifts to second gear (or some other higher gear) which provides reduced torque applied to the powertrain mount system and vehicle suspension system. For the D-N garage shift, as a vehicle slows down to a zero speed with the brake on, the vehicle is shifted into a higher gear. As the vehicle starts to launch, the vehicle is immediately shifted back to first gear, launching the vehicle with its first gear ratio.

17 Claims, 5 Drawing Sheets

Elements Applied — 65

| Gear | Ratio | UD | OD | R | 24 | LR | LC | DR |
|------|-------|----|----|---|----|----|----|----|
| 1 | 4.127 | X |   |   |    | X  | (X) |   |
| 2 | 2.842 | X |   |   |    | X  |    | X |
| 3 | 2.284 | X |   |   | X  |    | X  |   |
| 4' | 1.573 | X | X |   | X  |    |    | X |
| 4 | 1.452 | X | X |   |    |    | X  |   |
| 5 | 1.000 | X | X |   |    |    |    | X |
| 6 | 0.689 |   |   |   | X  |    |    | X |
| R | 3.215 |   |   | X |    | X  | X  |   |

METHODS AND SYSTEMS FOR DRIVE-TO-NEUTRAL AND NEUTRAL-TO-DRIVE TRANSMISSION GARAGE SHIFT QUALITY IMPROVEMENT

FIELD OF THE INVENTION

The present disclosure relates generally to automatic transmissions in automobiles, and more specifically, to methods and systems for improving the Neutral-to-Drive (N-D) and Drive-to-Neutral (D-N) garage shift transmission quality by reducing the energy applied to or stored in the powertrain mount and vehicle suspension systems.

BACKGROUND OF THE INVENTION

Automatic transmissions include multiple clutches, which are mechanisms for transmitting rotation. These clutches are selectively engaged and disengaged to provide a desired gear ratio between the transmission input and output shafts. Advantageously, an automatic 6-speed transmission with a high first gear ratio, a second gear ratio at a considerable lower value from the first, and all gears other than first that are fairly close together, provides improved performance and fuel, economy. The launch performance is improved through increased torque at first gear, and the fuel economy is improved at all gears because the engine can work in a much more favorable operating region. However, this creates a challenge to the transmission's garage shift quality. An example of such a 6-speed transmission is the 62TE transmission, available from DaimlerChrysler Corp. of Auburn Hills, Mich.

Garage shifts include a shift from neutral to drive or reverse, a shift from drive to neutral, or a shift from drive to reverse or from reverse to drive. Traditionally, the D-N garage shift is an uncontrolled, ballistic vent shift. During a garage shift, all the torque will act on, as well as be released from, a powertrain mount system which typically causes annoying garage shift bumps. For example, during the D-N shift, the hydraulic fluid in a clutch, such as an Under Drive (UD) clutch, vents through a manual lever control value. As soon as the clutch loses its capacity, a turbine in a torque converter will go to its floating position because it loses its connection with an output driveshaft and all of the potential energy stored in the powertrain mount system will be released with the whole powertrain returning to neutral position in a fraction of a second, which creates the bump during the D-N garage shift. An N-D garage shift is a controlled shift. During the N-D shift, when hydraulic fluid fills a clutch (e.g., UD clutch), the clutch tries to connect the engine to the drive shaft, and as a result reaction torque will cause the powertrain case to wind to an opposite direction from the engine output shaft rotation. Finally, the powertrain ease will be balanced by the mount system. Since this process happens in a traction of a second, it will generate an N-D garage shift bump felt by vehicle occupants.

A typical way to improve the D-N garage shift quality is to slow down the vent rate of the clutch, such as in the UD clutch, by reducing the orifice size. However, this has a negative side effect on the vent rate during Rock Cycle when it usually needs a high vent rate, and the D-N shift may take too long during extremely cold conditions. A smaller orifice will also slow down the fast fill period delaying engagement during N-D shift. U.S. Pat. No. 6,558,293 to Skupinksi et al. discloses a garage shift control method which makes the N-D shift by initially shifting to an upper gear ratio followed by shifting to a low gear ratio when the shift to upper gear is substantially complete or when a predetermined period time has elapsed since shift initiation. The Skupinksi reference improves the N-D garage shift quality; however the vehicle occupants may feel the down shift (because of the torque change from upper gear to lower gear ratios, especially for aggressive drivers, who launch the automobile as soon as putting the shift lever to the drive position) from upper gear to the first gear ratio. Further, the Skupinksi reference does not address the D-N shift, focusing solely on the N-D shift.

Methods and systems are needed to improve both D-N and N-D garage shift quality which overcome the aforementioned limitations without compromising on vehicle performance.

BRIEF SUMMARY OF THE INVENTION

In various exemplary embodiments, the present disclosure provides reduced torque applied to the powertrain mount system and vehicle suspension systems daring N-D garage shifts. Since less energy is stored in the mount system and suspension system, the reaction bump during garage shifts will be minimized. The present disclosure improves both the D-N and N-D garage shift. For the N-D garage shift, such as after key-on when a shift lever is positioned in drive, a vehicle shifts to second gear (or some other higher gear) which provides reduced torque applied to the drive shaft, which affects also the reaction torque being applied to the powertrain mount system and vehicle suspension system. As the vehicle starts to launch, the vehicle is immediately shifted back to first gear (e.g., as soon as a brake signal is off), launching the vehicle with its first gear ratio.

For the D-N garage shift, as a vehicle slows down to a zero speed with the brake on, the vehicle is shifted into second gear (or some other higher gear). Whenever the vehicle slows down to zero, there is a chance for a driver to perform a D-N garage shift. Shifting as the vehicle comes to a stop reduces the energy stored in the powertrain mount and vehicle suspension system. Therefore, the energy released from the powertrain mount system is greatly reduced whenever the driver performs a D-N shift, improving the D-N shift quality. Alternatively, if the vehicle is about to launch (i.e., brake signal is off), then the vehicle is immediately shifted hack to first gear, launching the vehicle with its first gear ratio.

The present disclosure shifts to a second gear ratio (or some other higher gear ratio) during the N-D shift, and remains there until the vehicle is about to launch. This improves garage shift quality without compromising performance. Advantageously, the present disclosure performs the shift from second (or other higher gear) to first gear only as a driver releases the brake before vehicle launch. In this way, the driver feels nothing unusual except the shift quality improvement (both N-D and D-N). Additionally, the present disclosure reduces the wear and tear on the vehicle by reducing torque acting on the vehicle powertrain mounts and suspension system. Advantageously, this potentially reduces vehicle warranty cost and cost of ownership.

In an exemplary embodiment of the present disclosure, a method for improving the drive-to-neutral and neutral-to-drive garage shift of a vehicle includes shifting to a higher gear relative to a first gear after key-on when a shift lever is positioned in drive and when the vehicle speed approaches a zero speed with a brake signal turned on, and shifting back to the first gear responsive to the brake signal being turned off, wherein the method is performed only if the vehicle's throttle is below a threshold throttle value and art engine speed is below a threshold revolutions per minute value, and the threshold throttle value and threshold revolutions per minute value are selected to prevent damage to the vehicle when shifting gears. The higher gear is a second gear with a gear ratio substantially less than a gear ratio of the first gear. The shifting to a higher gear step includes engaging a clutch. The shifting to a first gear step includes disengaging the clutch. Optionally, the clutch is a Direct (DR) clutch. The higher gear reduces torque applied to a powertrain mount system and a vehicle suspension system in the vehicle. A driver does not feel the shifting to a higher gear and the shifting back step. The vehicle speed approaching a zero speed includes one of the vehicle's speed less than 1 mile per hour and the torque converter's turbine speed of less than 50 revolutions per minute.

In another exemplary embodiment of the present disclosure, a method for improving the drive-to-neutral and neutral-to-drive garage shift of a vehicle includes engaging a first clutch at key-on and when the vehicle speed approaches a zero speed with a brake signal turned on, and disengaging the first clutch responsive to the brake signal being turned off, wherein the method is performed only if the vehicle's throttle is below a threshold throttle value and that an engine's speed is below a threshold revolutions per minute value, and the threshold throttle value and threshold revolutions per minute value are selected to prevent damage to the vehicle when shifting gears. The method further includes engaging a second clutch when a shift lever is positioned in drive from neutral, wherein the vehicle is in second gear with the first and second clutch engaged. Engaging the first clutch when the vehicle speed approaches a zero speed places the vehicle in second gear. Optionally, the clutch is a Direct (DR) clutch. The higher gear reduces torque applied to a powertrain mount system and a vehicle suspension system in the vehicle. A driver does not feel the shifting to a higher gear and the shifting back step. The vehicle speed approaching a zero speed includes one of the vehicle's speed less than 1 mile per hour and the torque converter's turbine speed of less than 50 revolutions per minute.

In yet another exemplary embodiment of the present disclosure, an automatic transmission system on a vehicle with improved drive-to-neutral, and neutral-to-drive garage shift quality includes a plurality of clutches, a plurality of force carriers operatively connected to the plurality of clutches, and a brake signal operable to determine the on/off state of a brake on the vehicle. The plurality of clutches are engaged and disengaged such that the vehicle is in a higher gear ratio relative to a first gear after key-on when a shift lever is positioned in drive and as the vehicle speed approaches a zero speed with the brake signal turned on, and the plurality of clutches are engaged and disengaged such that the vehicle is at the first gear ratio prior to vehicle launch. One of the plurality of clutches includes a direct (DR) clutch. The higher gear ratio includes a second gear with a gear ratio substantially less than a gear ratio of the first gear. The direct (DR) clutch is engaged to place the vehicle in second gear, and the direct (DR) clutch is disengaged to place the vehicle in first gear. The vehicle speed approaching a zero speed comprises one of the vehicle's speed less than 1 mile per hour and the torque converter's turbine speed of less than 50 revolutions per minute.

BRIEF DESCRIPTION OF THE DRAWINGS

The present disclosure is illustrated and described herein with reference to the various drawings, in which like reference numbers denote like method steps and/or system components, respectively, and in which.

DETAILED DESCRIPTION OF THE INVENTION

In various exemplary embodiments, the present disclosure provides reduced torque applied to the powertrain mount system and vehicle suspension systems during garage shifts. Since less energy is stored in the powertrain mount system and suspension system, the reaction hump during garage shifts will be reduced without compromising vehicle performance. The present disclosure improves both the D-N and N-D garage shift. For the N-D garage shift, such as after key-on when a shift lever is positioned in drive, a vehicle shifts to second gear (or some other higher gear) which provides reduced torque applied to the drive shaft, which also reflects a reduced reaction on the powertrain mount system and vehicle suspension system. As the vehicle starts to launch, the vehicle is immediately shifted back to first gear (e.g., as soon as a brake signal is off), launching the vehicle with its first gear ratio.

For the D-N garage shift, as a vehicle slows down to a zero speed with the brake on, the vehicle is shifted into second gear (or some other higher gear). Whenever the vehicle slows down to zero, there is a chance for a driver to perform a D-N garage shift. Shifting as the vehicle comes to a stop reduces the energy store in the powertrain mount and vehicle suspension system. Therefore, the energy stored in the powertrain mount system is greatly reduced if the driver performs a D-N shift with improving D-N shift quality. Alternatively, if the vehicle is about to launch (i.e., brake signal is off), then the vehicle is immediately shifted back to first gear, launching the vehicle with its first gear ratio.

The present disclosure shifts to a second gear ratio (or some other higher gear ratio) during the N-D shift, and remains there until the vehicle is launched. This improves garage shift quality without compromising performance. Advantageously, the present disclosure performs the shift from second (or other higher gear) to first gear only as a driver releases the brake before vehicle launch. In this way, the driver feels nothing unusual except the shift quality improvement (both N-D and D-N). Additionally, the present disclosure reduces the wear and tear on the vehicle by reducing torque acting on the vehicle powertrain mounts and suspension system. Advantageously, this potentially reduces vehicle warranty cost and cost of ownership.

Figure 1:
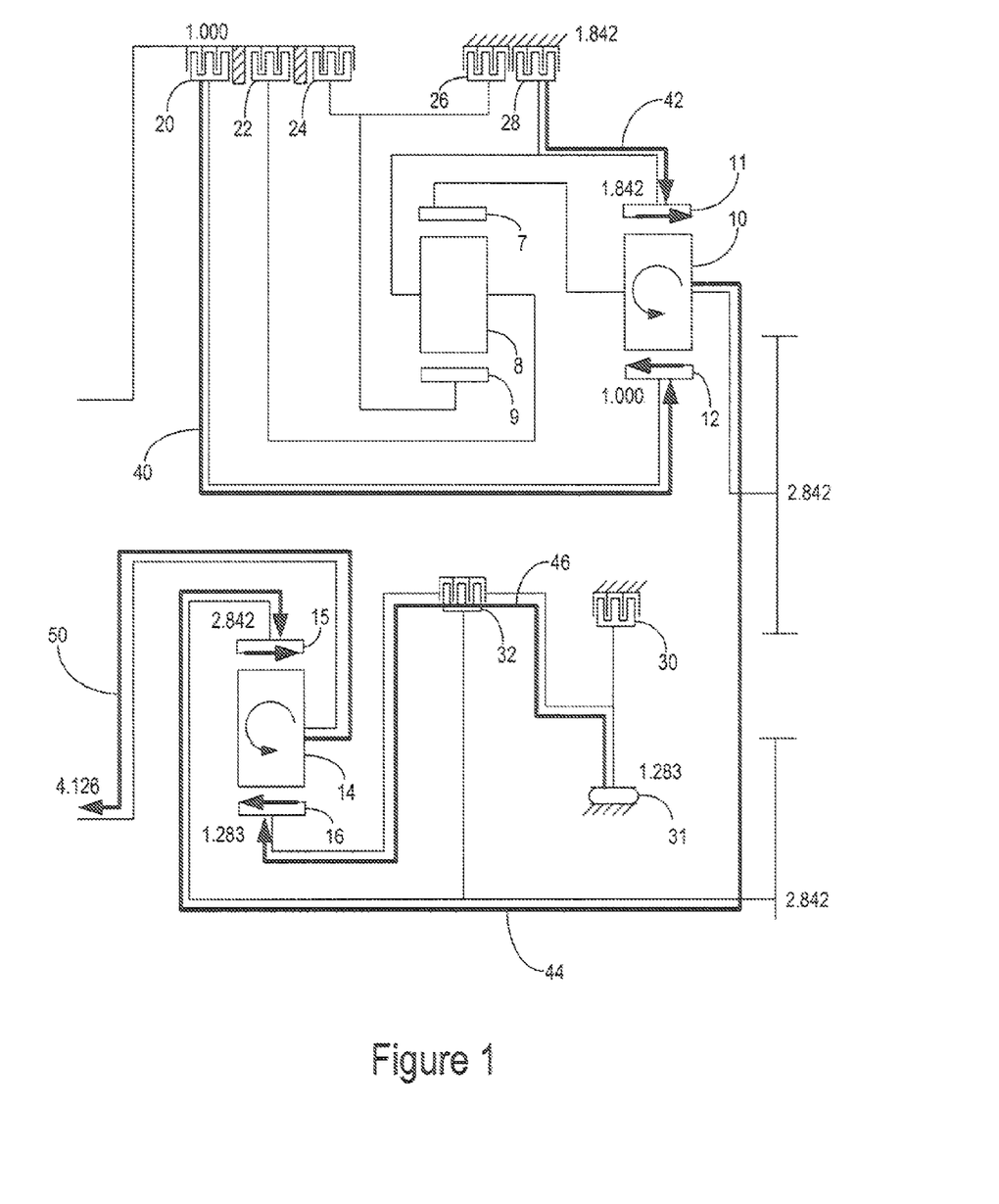
FIG. 1 is a schematic diagram illustrating the torque path flow in first gear through a plurality of clutches in an exemplary transmission.
Figure 2:
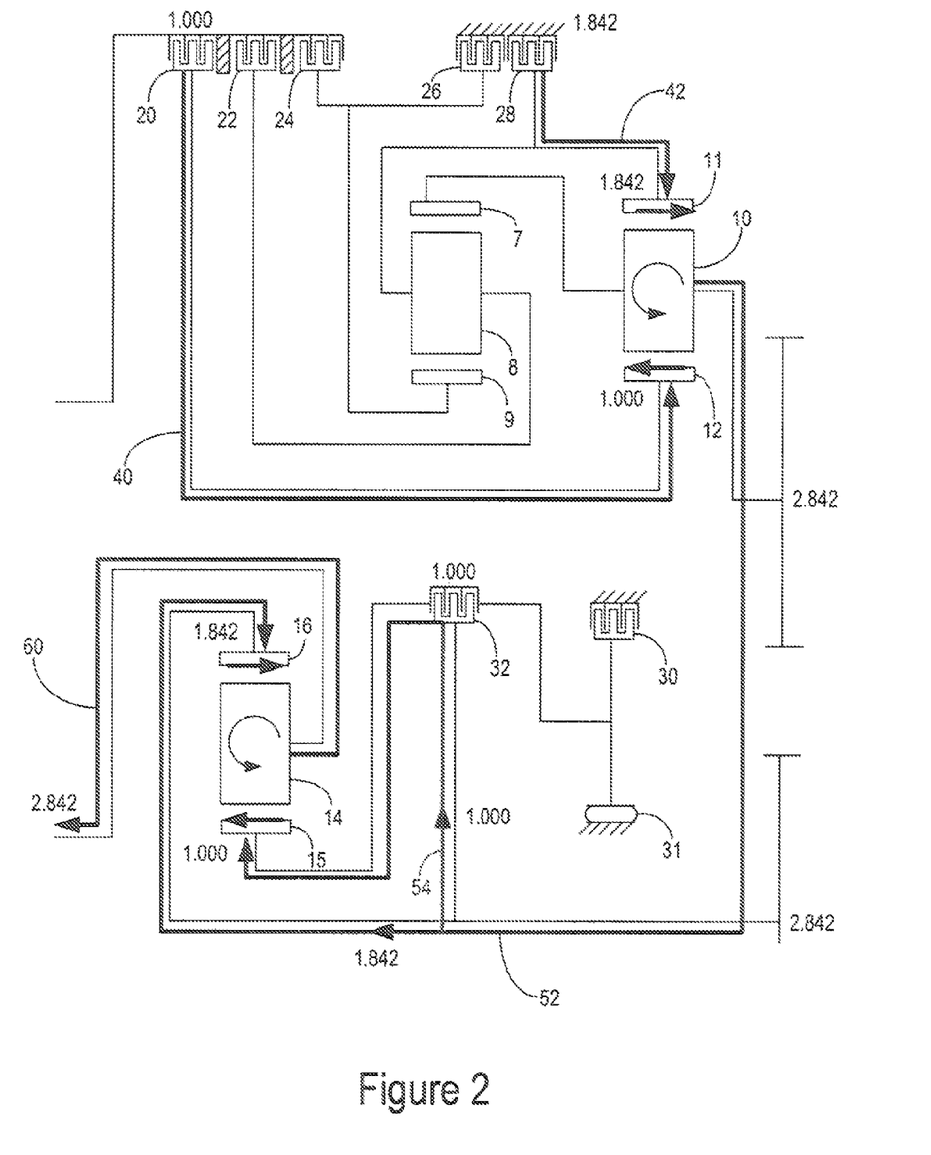
FIG. 2 is a schematic diagram illustrating the torque path flow in second gear through a plurality of clutches in as exemplary transmission.
Figure 3:
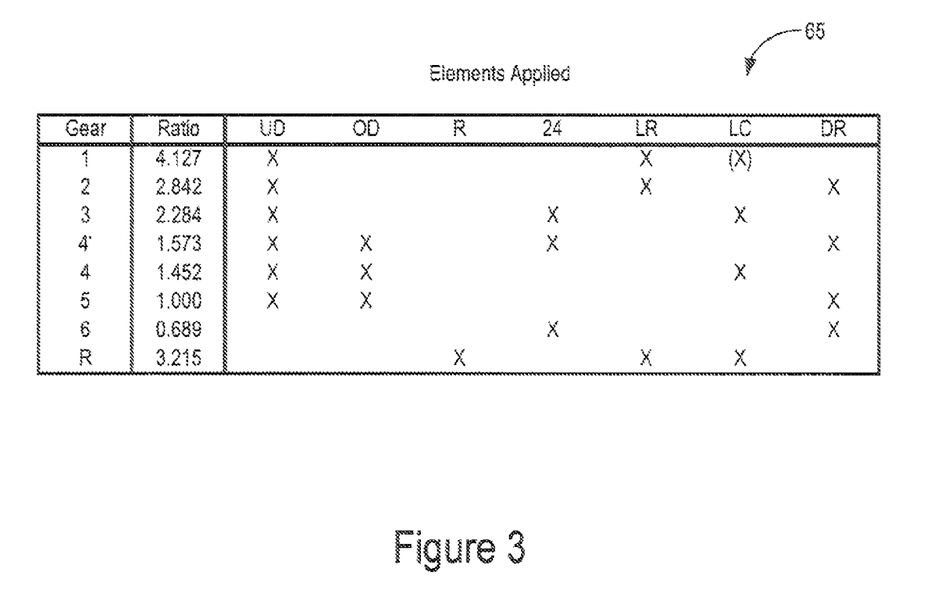
FIG. 3 is a schematic diagram and table illustrating the elements applied in various gears of an exemplary transmission.

Referring to FIGS. 1 through 3, a schematic of the torque flow of an exemplary 6-speed transmission is illustrated in first and second gears. For illustration purposes, the schematic illustrates the top half of planetary gear sets only. FIGS. 1 and 2 illustrate a 62TE transmission from DaimlerChrysler Corp. as an exemplary embodiment of the present disclosure. FIG. 3 illustrates a table showing the elements engaged in the various gear ratios of the 62TE transmission. Based on the 41TE transmission (also from DaimlerChrysler Corp.), the 62TE transmission adds an extra set of planetary gear sets to the back of the 41TE transmission. Those of ordinary skill in the art will recognize the methods and systems of the present disclosure can be utilized with any automatic transmission, and the 62TE transmission is shown as an example for illustration purposes.

The 62TE transmission has a higher first gear ratio than the 41TE transmission, designed to make takeoffs from a stop with improved performance. As illustrated in table 65, the gear ratios are as follows for the 62TE transmission: First at 4.127, Second at 2.842, Third at 2.284, Fourth at 1.452, Fourth Prime at 1.573, Fifth at 1.000, Sixth at 0.689, and Reverse at 3.215. Of note is the "fourth prime" gear, when the driver accelerates, the transmission uses the standard fourth gear; when the driver hits the gas pedal for passing another car, the transmission kicks down to "fourth prime," to make the shift feel smoother while still providing a good power increase. The 62TE transmission uses variable line pressure (VLP); that is, it will frequently adjust its internal fluid pressure to reduce parasitic losses from the pump and hydraulic system, increasing gas mileage and lengthening the transmission lifespan. The 62TE transmission six-speed automatic has adaptive electronic control; the torque converter clutch is electronically modulated.

FIG. 1 illustrates the torque path flow with the transmission in the first gear ratio (e.g., a 4.127 gear ratio) as it is traditionally when the. shift lever is shifted to the Drive position from neutral. For example, the 62TE transmission includes an Under Drive (UD) clutch 20, a Low Reverse (LR) clutch 28, and a compounder over running clutch 31 which are all engaged at first gear. Also, the 62TE transmission includes an Over Drive (OD) clutch 22, Reverse (RC) clutch 24, and Direct (DR) clutch 32 which are not engaged in first gear. A low gear (LC) clutch 30 may or may not be engaged in first gear depending on operating conditions, such as during coast down or reverse.

The schematic diagrams of FIGS. 1 and 2 illustrate the path of torque flow from an input which usually connects to a torque converter turbine (not shown) through various clutches 20, 22, 24, 26, 28, 30, 31, and 32 and planetary gear sets 7, 8, 9, 10, 11, 12, 14, 15, and 16. At first gear (FIG. 1), the UD clutch 20 enacts second planetary set sun gear 12 to the input torque and LR clutch 28 and second planetary set ring gear 11 acts as a pivot. The second planetary gear carrier 10 set obtains a torque ratio of 2.842 through torque path 44 as an input to a compounder ring gear 15 along with the pivot torque from the overrunning clutch 31 and a compounder sun gear 16 providing a gear ratio from the compounder carrier 12 of 4.126 which acts upon drive shaft to the wheel through torque path 50, and a reaction force acts upon the mount system.

In this exemplary embodiment of the 62TE transmission, the compounder over running clutch 31 is automatically engaged when the UD clutch 20 is engaged. During a N-D garage shift, the torque converter turbine speed goes to zero as soon as the transmission output torque is balanced with the powertrain mount spring torque. The 62TE transmission applies the 4.126 gear ratio on top of the engine output torque to the transmission. During D-N garage shifts, the hydraulic fluid in the UD clutch 20 vents through manual lever control value. As soon as the UD clutch 20 loses its capacity, the turbine will go to its floating position and release all its potential energy in the powertrain mount system in a fraction of a second. This is the source of the disturbance or bumps during the D-N garage shifts in the 62TE transmission.

FIG. 2 illustrates the torque path flow with the transmission in the second gear ratio (e.g., a 2.842 gear ratio). Here, both the UD clutch 20 and LR clutch 28 still are engaged to the secondary planetary gear set 10, 11, and 12. Additionally, the DR clutch 32 is engaged and the compounder over running clutch 31 is disengaged. A torque path 52 from the secondary planetary carrier 10 is divided between a 1.000 ratio flowing on path 54 to the DR clutch 32 and 1.842 ratio to the compounder ring gear 16. The DR clutch 32 applies a 1.000 torque ratio on the compounder sun gear 15. When the DR clutch 32 engages, the compounder planetary gear sets 14, 15, and 16 are locked together, and the torque ratio equals one. Therefore, the output torque ratio is equal to the output of the secondary planetary carrier 10, or 2.842. Accordingly, compounder carrier 14 provides a torque flow of 2.842 on torque path 60.

FIG. 3 illustrates in table 65 the elements applied at each gear in the 62TE transmission. In an exemplary embodiment of the present disclosure, the DR clutch 32 is engaged at key-on and as the vehicle goes to a zero speed with the brake on. At key-on, the UD clutch 20 is in a disengaged position, but when the vehicle's shift lever is placed into the Drive position, the UD clutch is engaged and the vehicle is in second gear. As the vehicle goes to a zero speed with the brake on, engaging the DR clutch 32 places the vehicle in second gear. Triggers are used to determine when the vehicle is going to a zero speed. For example, the triggers can include vehicle speed or turbine speed. As such, when the trigger is high and the brake is on, the DR clutch 32 is engaged. In one embodiment, the trigger is set high when the turbine speed is less than 50 revolutions per minute (RPM) depending on calibration. The turbine speed offers a higher resolution than the vehicle speed. In another embodiment, the trigger is set to high when the vehicle speed is less than one mile-per-hour (MPH).

Since the second gear ratio is 2.842, which is much less than the first gear ratio of 4.126, the torque applied to the powertrain mount and vehicle suspension system is reduced. Since less energy is applying to or stored in the powertrain mount system and vehicle suspension system, the reaction bump during a garage shift is reduced. Alternatively, any other clutch or mechanism can be implemented which shifts the vehicle into second (or other higher) gear when the vehicle goes to a zero speed with the brake on or after key-on when the shift lever is engaged in Drive to reduce the torque applied.

Figure 5:
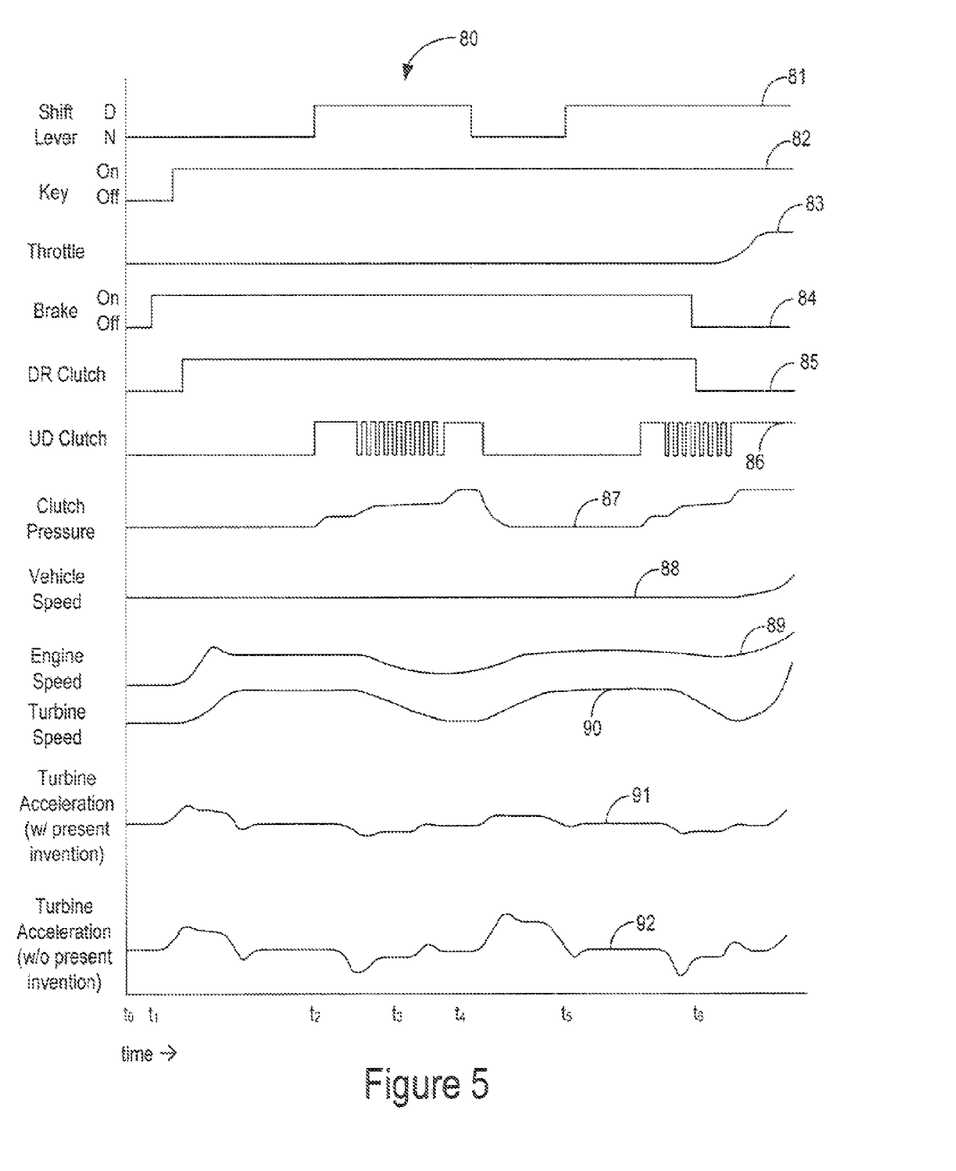
FIG. 5 is a graph illustrating garage shifts and the corresponding improvements due to the methods of the present disclosure.

During vehicle launch, the DR clutch 32 will be released as soon as the brake signal is in off position. For example, the DR clutch 32 is automatically disengaged responsive to one of the following conditions: the 'brake off' signal on a signal bus from a controller, engine RPM exceeding a certain trigger, or throttle exceeding a certain trigger where throttle means throttle angle or throttle position voltage. The shift from second to first gear only happens when a driver releases the brake before launching the vehicle, or the throttle or engine RPM triggers are met. In this way, the driver feels nothing unusual except the shift quality improvement (both N-D and D-N). Therefore, the vehicle will be launched with its first gear ratio. This means that the driver will enjoy good garage shift quality without compromising the vehicle performance. The garage shift data from a vehicle with this new feature is illustrated in FIG. 5.

Figure 4:
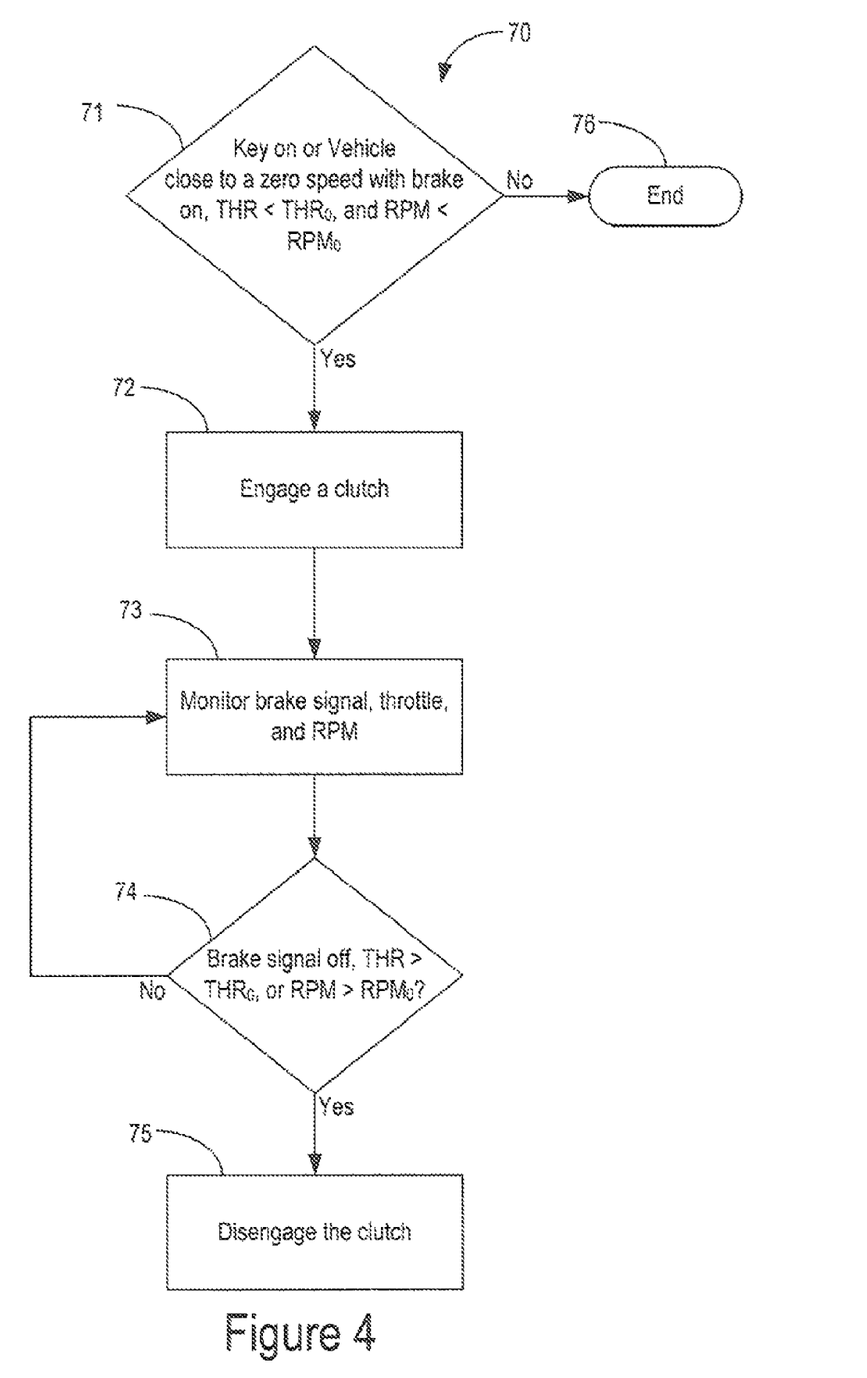
FIG. 4 is a flowchart illustrating an exemplary method of the present disclosure.

Referring to FIG. 4, a method 70 of the present disclosure to improve garage shift quality checks to see if the vehicle is at key-on or close to a zero speed with the brake on, that the vehicle's throttle (THR) is below a threshold, throttle value (THR$_0$), and that a engine speed revolutions per minute (RPM) is below a threshold RPM$_0$ value, as depicted in step 71. All of the conditions in step 71 must be met to engage the method 70. At key-on, there is a potential for a N-D garage shift once the shift lever is positioned in Drive and the brake is released. At close to a zero speed with the brake on, there is a potential for a D-N garage shift once the vehicle is at a stop. The limits of throttle and engine RPM prevent damage to the transmission system. For example, the method 70 will end if the throttle is being stepped on, or if the torque converter's RPM are above a threshold limit (e.g., 50 RPM). If one of the conditions is not met in step 71, then the method 70 ends, as depicted in step 76.

If all of the conditions in step 71 are met, then a clutch is engaged, as depicted in step 72. For example, the DR clutch can be engaged in a Chrysler 62TE transmission. At key-on by engaging the DR clutch, the vehicle will be put into second gear when the shift lever is positioned in drive for an N-D shift. When the shift lever is positioned in drive, a second clutch, such as the UD clutch in the Chrysler 62TE transmission, will be engaged placing the vehicle in second gear after key-on and after the shift lever is moved to drive, but with the brake on prior to vehicle launch. As the vehicle is close to a zero speed with the brake on, the clutch (e.g., DR clutch) places the vehicle in second gear. Accordingly, the vehicle will be in or placed in second (or higher) gear during a D-N or N-D garage shift. The clutch engaged will vary depending on the transmission configuration, but those of ordinary skill in the art will recognize that method 70 can be applied to any transmission.

Next, the brake signal, throttle, and engine RPM are monitored, as depicted in step 73. In step 74, a decision is made responsive to the brake signal being on or off, the throttle exceeding a threshold, or the engine RPM exceeding a threshold. If the brake signal is on or the throttle is below the threshold, and the engine RPM is below the threshold, then the method 70 waits until the brake signal is off, or throttle exceeds the threshold, or the engine RPM exceeds the threshold (i.e., back to the monitor step 73). If the brake signal is off, or throttle exceeds the threshold, or the engine RPM exceeds the threshold, then the clutch is disengaged, as depicted in step 75. For example, the DR clutch is disengaged. By disengaging the clutch, the vehicle is positioned m first gear as the vehicle launches. Accordingly, the vehicle remains in second (or a higher) gear while the brake is on, but shifts to first gear only as the brake is released before vehicle launch.

Advantageously, the driver and other occupants will feel nothing unusual with method 70 except for improved shift quality. The occupants never feel the transmission being shifted into second (or a higher) gear during the garage shift because it is always in first gear during vehicle launch and the shifts happen at almost a zero vehicle speed, therefore the shift quality is improved without performance reduction. Further, the reduced torque acting on the powertrain mounts and vehicle suspension system further reduces vehicle wear and tear which accordingly can save cost in repairs. Because of the almost perfect garage shift quality, the present disclosure not only improves the J.D. Power Shift Quality Rating and customer satisfaction, but also potentially reduces the warranty cost for transmission and powertrain mount systems due to the reduced torque.

Referring to FIG. 5, a graph 80 illustrates exemplary data showing the present disclosure in operation in a real vehicle with a 62TE transmission over time (horizontal-axis). As described herein, the systems and methods of the present disclosure can be utilized with any automatic transmission, and the 62TE transmission is presented for illustration purposes. The graph 80 illustrates both a D-N and N-D garage shifts and the corresponding reduction in torque. Line 81 shows a shift lever in either the drive or Neutral position over time. The shift lever is used to place the vehicle in drive, neutral, reverse, and the like. Line 82 shows the state of the key (i.e., on or off). The key line 82 starts in the off position, and is turned on for the remainder of the graph showing the vehicle is turned on. Line 83 shows the throttle (THR). Line 84 shows the brake signal either on or off. Lines 85 and 86, respectively, show the state of the DR and UD clutches (i.e., engaged or disengaged). Line 87 illustrates the UD clutch pressure. Lines 88, 89, and 90, show the vehicle, engine, and turbine speed, respectively.

Lines 91 and 92 illustrate turbine acceleration with and without the present invention, respectively, to illustrate the improvement in garage shift quality. The turbine acceleration 91 and 92 shows the rate of change of the speed of the turbine. Utilizing the equation, force=mass·acceleration (f=m·a), the force felt by vehicle occupants to a certain degree is responsive to the acceleration of the turbine when the transmission connects the turbine to the vehicle drive shaft. Accordingly, a reduction in acceleration change will reduce the bump force. The turbine acceleration 91 and 92 lines depict the acceleration which in turn is directly correlated to the force, i.e. the garage shift bump.

At time $t_0$, the engine of the vehicle is initially off with the key line 82 showing the key off, the shift level 81 in neutral, both the DR and UD clutches 85 and 86 disengaged, and all the speeds 88, 89, and 90 at zero. Next at time $t_1$, a driver applies the brake 84 and turns the key 82 on. As described herein, the DR clutch 85 engages following the key on. At and after time $t_1$, the vehicle speed. 88 remains at zero, but the engine and turbine speeds 89 and 90 increase.

Next at time $t_2$, the shift lever 81 is moved to the Drive position. This engages the UD clutch 86 which connects the engine to the drive shaft and wheel at the same time, and a reaction torque applies to the vehicle's powertrain mount system. At time $t_3$, the turbine speed 90 starts to drop to zero and eventually goes to zero as the UD clutch 86 starts to have capacity and gradually engages, which is controlled by a solenoid duty cycle. The UD clutch pressure 87 initially rises at a fast rate, but the duty cycle slows the rate after clutch volume is filled with transmission oil. At this point (i.e., between times $t_2$ and $t_3$) there is usually a garage shift bump as the turbine speed 90 drops and the turbine acceleration 91 and 92 changes (i.e., the turbine is connected with the drive shaft and reaction torque applies to the engine mount system). However, the DR clutch 85 is still engaged so that the vehicle is in second gear and the bump is significantly reduced, as shown by line 91.

In this example at time $t_4$, a drive-to-neutral shift is performed placing the shift lever 81 back into neutral. Accordingly, the UD clutch 86 disengages, and the turbine speed 90 increases again after time $t_4$. Here, another possible garage shift bump may be felt, as shown by turbine acceleration 91 and 92, hut again the DR clutch 85 is engaged so the vehicle is in second gear before the D-N shift, which improves the bump. At time $t_5$, the vehicle is shifted from neutral to drive by placing the shift lever 81 into the drive position. Accordingly, the UD clutch 86 engages and its solenoid goes through a duty cycle again to reduce the rate of clutch pressure 87 increase, and the turbine speed 90 gradually goes to zero.

At time $t_6$, the driver releases the brake 84, and the vehicle disengages the DR clutch 85 responsive to the brake off signal (and since the shift lever 81 is in Drive). The vehicle has now shifted from second to first gear, and the driver has not felt this shift. However, the vehicle reduced the torque applied to the powertrain mount and vehicle suspension system by remaining in second gear during garage shifts. After time $t_6$, the throttle 83 is increased and the vehicle launches in first gear ratio with the speeds 88, 89, and 90 all increasing.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for improving the drive-to-neutral and neutral-to-drive garage shift of a vehicle, comprising:
    shifting to a higher gear relative to a first gear after key-on when a shift lever is positioned in drive and when the vehicle speed approaches a zero speed with a brake signal turned on; and
    shifting back to the first gear responsive to the brake signal being turned off;
    wherein the method is performed only if the vehicle's throttle is below a threshold throttle value and an engine speed is below a threshold revolutions per minute value, and wherein the threshold throttle value and threshold revolutions per minute value are selected to prevent damage to the vehicle when shifting gears.

2. The method of claim 1, wherein the higher gear comprises a second gear with a gear ratio substantially less than a gear ratio of the first gear.

3. The method of claim 1, wherein the shifting to a higher gear step comprises engaging a clutch.

4. The method of claim 3, wherein the shifting to a first gear step comprises disengaging the clutch.

5. The method of claim 4, wherein the clutch comprises a Direct (DR) clutch.

6. The method of claim 1, wherein the higher gear reduces torque applied to a powertrain mount system and a vehicle suspension system in the vehicle.

7. The method of claim 1, wherein the vehicle speed approaching a zero speed comprises one of the vehicle's speed less than 1 mile per hour and a torque converter's turbine speed of less than 50 revolutions per minute.

8. A method for improving the drive-to-neutral and neutral-to-drive garage shift of a vehicle, comprising:
    engaging a first clutch at key-on and when the vehicle speed approaches a zero speed with a brake signal turned on so as to place the vehicle in second gear; and
    disengaging the first clutch responsive to the brake signal being turned off;
    wherein the method is performed only if the vehicle's throttle is below a threshold throttle value and an engine speed is below a threshold revolutions per minute value, and wherein the threshold throttle value and threshold revolutions per minute value are selected to prevent damage to the vehicle when shifting gears.

9. The method of claim 8, further comprising:
    engaging a second clutch when a shift lever is positioned in drive from neutral, wherein the vehicle is in the second gear with the first and second clutch engaged.

10. The method of claim 8, wherein the clutch comprises a Direct (DR) clutch.

11. The method of claim 8, wherein the higher gear reduces torque applied to a powertrain mount system and a vehicle suspension system in the vehicle.

12. The method of claim 8, wherein the vehicle speed approaching a zero speed comprises one of the vehicle's speed less than 1 mile per hour and a torque converter's turbine speed of less than 50 revolutions per minute.

13. An automatic transmission system on a vehicle with improved drive-to-neutral and neutral-to-drive garage shift quality, comprising;
    a plurality of clutches;
    a plurality of force carriers operatively connected to the plurality of clutches; and
    a brake signal operable to determine an on/off state of a brake on the vehicle;
    wherein the plurality of clutches are actuated in a first configuration such that the vehicle is in a higher gear ratio relative to a first gear ratio after key-on when a shift lever is positioned in drive and as the vehicle speed approaches a zero speed with the brake signal in an on state; and
    wherein the plurality of clutches are actuated in a second configuration such that the vehicle is at the first gear ratio prior to vehicle launch, and
    wherein the plurality of clutches are actuated when the vehicle's throttle is below a threshold throttle value and an engine speed is below a threshold revolutions per minute value, and wherein the threshold throttle value and threshold revolutions per minute value are selected to prevent damage to the vehicle when shifting gears.

14. The transmission system of claim 13, wherein one of the plurality of clutches comprises a direct (DR) clutch.

15. The transmission system of claim 14, wherein the higher gear ratio comprises a second gear with a gear ratio substantially less than a gear ratio of the first gear.

16. The transmission system of claim 15, wherein the direct (DR) clutch is engaged to place the vehicle in second gear, and wherein the direct (DR) clutch is disengaged to place the vehicle in first gear.

17. The method of claim 13, wherein the vehicle speed approaching a zero speed comprises one of the vehicle's speed less than 1 mile per hour and a torque converter's turbine speed of less than 50 revolutions per minute.

* * * * *